United States Patent
Rumani

(10) Patent No.: US 8,825,824 B2
(45) Date of Patent: Sep. 2, 2014

(54) SYSTEMS AND METHODS FOR MACHINE CONFIGURATION

(75) Inventor: Daanish Usman Rumani, Thane (IN)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 13/407,186

(22) Filed: Feb. 28, 2012

(65) Prior Publication Data

US 2013/0227258 A1    Aug. 29, 2013

(51) Int. Cl.
*G06F 15/173*    (2006.01)

(52) U.S. Cl.
USPC ........... 709/223; 709/203; 709/206; 709/217; 709/219; 345/629; 713/1

(58) Field of Classification Search
CPC ... G05B 19/0426; G05B 23/02; G06F 15/177
USPC ........ 709/223, 203, 217, 219; 345/629; 713/1
See application file for complete search history.

(56) References Cited

U.S. PATENT DOCUMENTS

2011/0115816 A1*   5/2011   Brackney ............... 345/629

FOREIGN PATENT DOCUMENTS

| EP | 2367084 A1 | 9/2011 |
|----|------------|--------|
| EP | 2375296 A1 | 10/2011 |
| WO | 2011042632 A1 | 4/2011 |

OTHER PUBLICATIONS

Search Report and Written Opinion from corresponding EP Application No. 13157123, dated Jul. 2, 2013.

* cited by examiner

*Primary Examiner* — Frantz Jean
(74) *Attorney, Agent, or Firm* — Fletcher Yoder, P.C.

(57) ABSTRACT

Disclosed herein are methods and systems for a machine configuration. In an embodiment, an image capture device captures an image associated with a machine. A diagnostic device receives the image and extracts data from the image that identifies the machine. Once the machine is identified associated configuration data is used to configure the diagnostic device.

18 Claims, 3 Drawing Sheets

SYSTEMS AND METHODS FOR MACHINE CONFIGURATION

TECHNICAL FIELD

The technical field generally relates to plant systems and more specifically relates to the configuration of plant systems.

BACKGROUND

Field service engineers have the repeated task of configuring machines so that monitoring and diagnostic data about machine health can be collected from the field. The machine configuration involves collecting properties of the machine from the field and using this to configure a condition monitoring system.

Each machine has a name plate outside of the machine displayed with typed or etched information that lists the details of the machine and its properties. These properties are used to configure the machine in the condition monitoring system. These properties are usually noted down in a notebook while on a field visit and then manually entered into the condition monitoring system.

BRIEF DESCRIPTION OF THE INVENTION

Disclosed herein are methods and systems for machine configuration. In an embodiment, an image is captured which may contain a nameplate of a machine. The text in the image may be extracted from the image. The extracted text may be compared with a repository of data of known machines and ultimately matched to corresponding configuration data. The corresponding configuration data may be used to configure a diagnostic device.

In an embodiment, a system is provided including that may include an image capture device that may capture an image associated with a machine and another device configured to receive the image, extract data from the image that identifies the machine, retrieve configuration data based on the identity of the machine, and configure the device based on the retrieved configuration data.

In yet another embodiment, a computer readable storage medium may include instructions that when executed by a processor cause said processor to receive an image, extract data from the image that identifies a machine, retrieve configuration data based on the identity of the machine, and configure a device based on the retrieved configuration data.

This Brief Description of the Invention is provided to introduce a selection of concepts in a simplified form that are further described below in the Detailed Description. This Brief Description of the Invention is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Machinery diagnostics systems may be configured for optimization of equipment and selected processes, condition monitoring, and event diagnostics. The diagnostic device may need to configure a large number of machines. Although this can be done at any time, the configuration may be done most often for new machines or initial implementations of machines. This task may take hours of effort and may be prone to mistakes. Quality may be affected if machines are not quickly and accurately configured. Prior attempts to quickly configure machines have focused on use of templates and libraries of templates where machines already configured are used as templates to configure other similar machines. For example, if a motor of a specific type has been configured in the software, other instances of the machine are configured based on this motor as a template. Herein we discuss methods and systems that integrate image processing and template libraries, among other things, to perform automatic system configuration.

Figure 1:
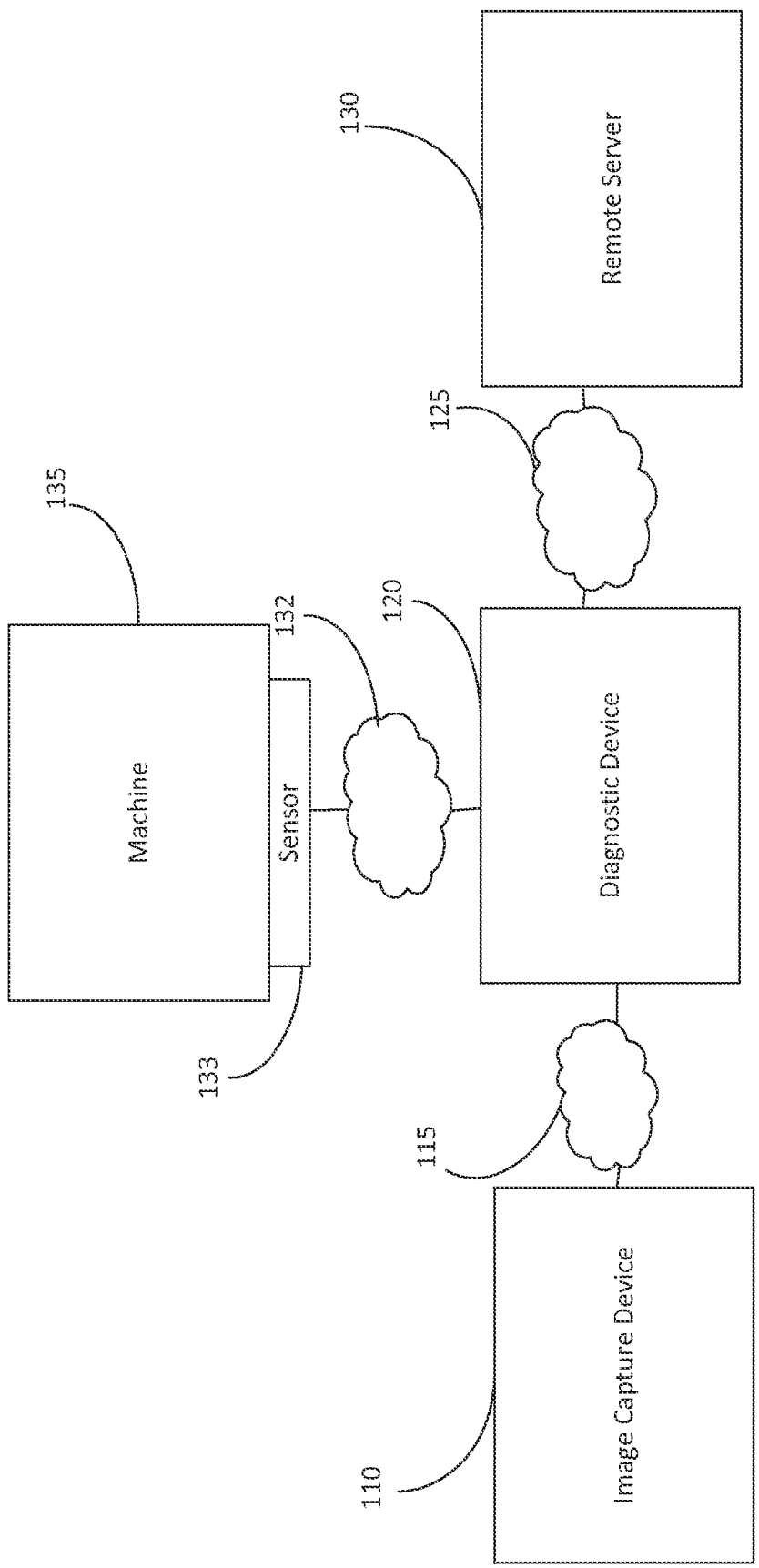
FIG. 1 displays a box diagram of an exemplary machine configuration system.

FIG. 1 displays a box diagram of an exemplary machine configuration system. Image capture device 110 may capture an image of relevant information for machine configuration. Image capture device 110 may be a camera, a camera phone, a video camera, an infrared camera, or a similar device that may record images. At 115, there may be a communication connection between block 110 and block 120. Communication connection 115 may be a wired or wireless connection. There may be diagnostic device 120 that may download an image captured by image capture device 110 and processes the image. For example, the image may comprise an image of a machine (e.g., turbine) and a nameplate which may be considered part of the machine. The nameplate may have text that is associated with the machine. The image may be processed by using optical character recognition (OCR) and the data resulting from OCR may be used by diagnostic device 120 to configure the diagnostic device 120 for the machine associated with the image capture.

Diagnostic device 120 may be connected via wires or wireless to remote server 130. The remote server 130 may have access to additional diagnostic device configuration data associated with machine 135 that is not locally connected to or locally stored with diagnostic device 120. For example, diagnostic device 120 may search its local database and may not find any configuration data for machine 135. Machine 135 may be a gas turbine, steam turbine, generator, motor, pump, for fan, for example. Diagnostic device 120 may query remote server 130, which may be connected via communication connection 125. The communication connection 125 may be wired or wireless and may include an Internet connection. Remote server 130 may connect to a database that has configuration data associated with machine 135 for diagnostic device 120. There may be a wired or wireless communication connection 132 connected to sensor 133 (e.g., heat sensor) that may be used to report performance data (e.g., temperature) of machine 135 to diagnostic device 120. The functionality of FIG. 1 may be in one device (e.g., a smartphone) or in several devices.

Figure 2:
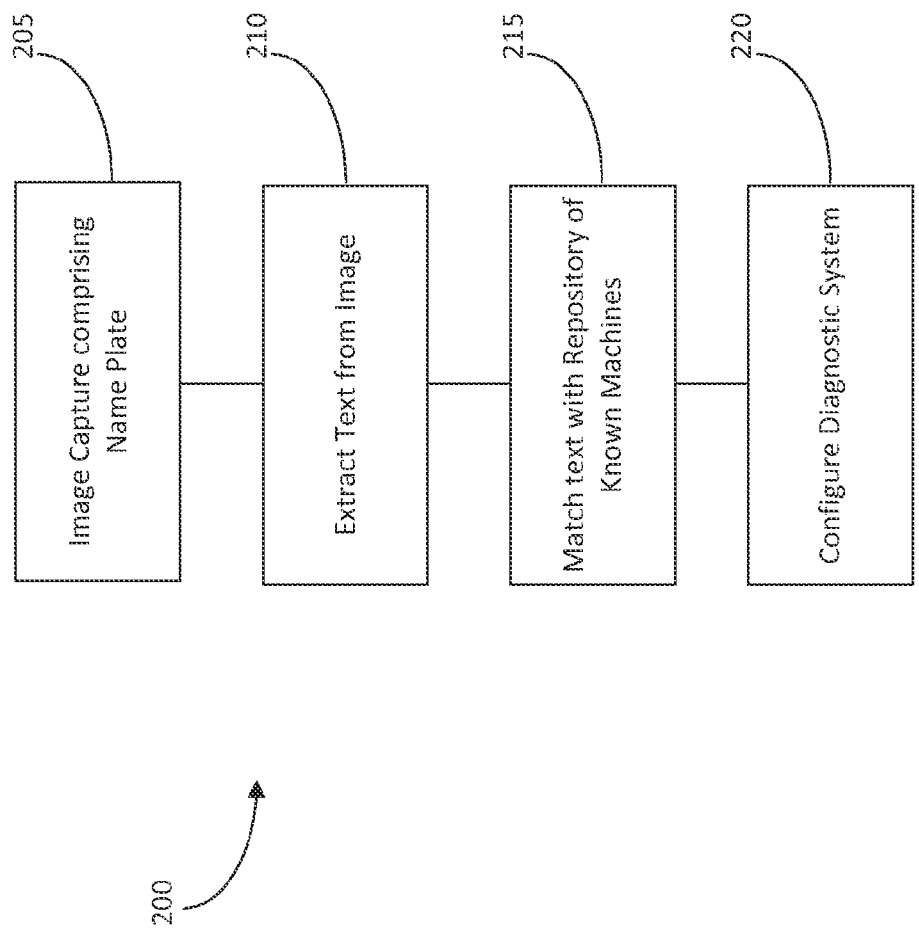
FIG. 2 illustrates a non-limiting, exemplary method of implementing a machine configuration system.

FIG. 2 illustrates a non-limiting, exemplary method of implementing a machine configuration system. Method 200 may be performed by computing equipment including mobile devices (e.g., phones and tablet computers), servers, or any other device that may execute computing functions.

In an embodiment at block 205, an image is captured and may contain an image of a nameplate of a machine. The image may be captured by a camera phone, digital camera, tablet computer, and the like. At block 210, text may be extracted from the image. The text may be extracted by optical character recognition (OCR). At block 215, the extracted text may be compared with a repository of known machines and ultimately matched with associated machine data used to configure a diagnostic device at block 220.

In an embodiment, the image captured may include an image of a particular machine or machine part. At block 210 instead of (or in addition to) using text from a nameplate the image of the machine or machine part may be extracted and used to identify the type of machine and the additional data needed to configure the corresponding diagnostic device. Similar to facial recognition system the machine or machine part image may be matched with appropriate configuration data for the diagnostic device. The functionality of FIG. 2 may be done using one device or multiple distributed devices.

In an embodiment, a photo may be taken using a smart phone or a portable device (tablet, laptop, etc.) and the portable device may include the functionality of diagnostic device. The portable device may be configured to analyze the text that the photo contains. The text might look like "Name: GE Pegasus; MHV Rating: 100-20,000 HP 75-15,000 kW; Model: 8200 (NEMA) 400 (IEC)." All or parts of the text may be used in a configuration data search of a local database or on a remote web service. A successful match may indicate that the machine and its properties have been identified. The local database/remote server may return a template to be used to automatically configure the machine. In an embodiment, the local database/remote server may return more than one match or no match at all. In the case of more than one match, the user may be given a chance to select the appropriate template to configure the machine. In the case where there is no match, a generic template or template that is the closest match may be selected.

Without in any way limiting the scope, interpretation, or application of the claims appearing herein, a technical effect of one or more of the example embodiments disclosed herein is to provide automated configuration that it is less prone to errors and therefore increases the quality of the configuration and decreases the time to configure a diagnostic device for multiple machines.

Figure 3:
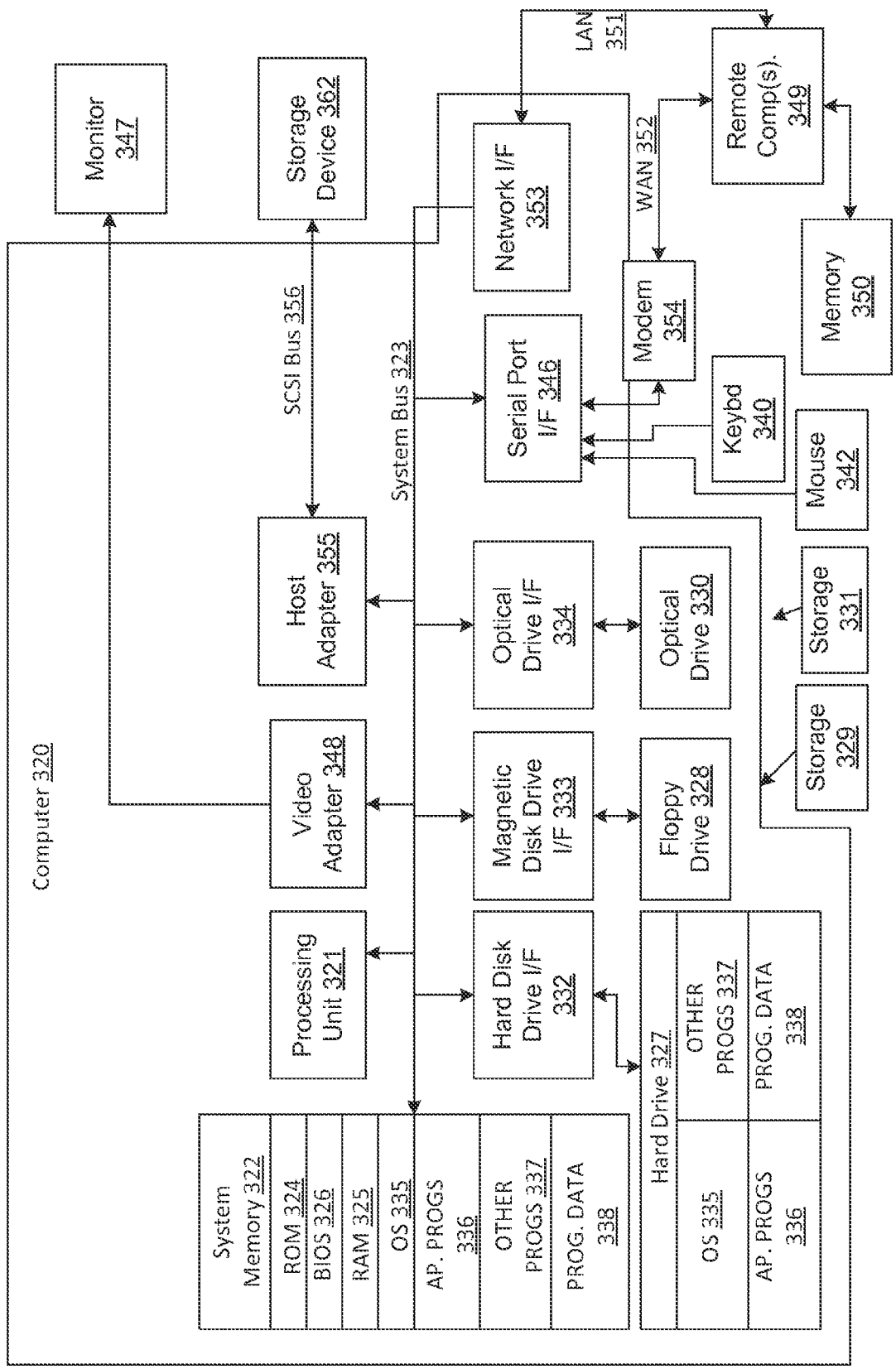
FIG. 3 is an exemplary block diagram representing a general purpose computer system in which aspects of the present invention thereof may be incorporated.

FIG. 3 and the following discussion are intended to provide a brief general description of a suitable computing environment in which the present invention and/or portions thereof may be implemented. Although not required, the invention may be described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers, mobile phones, and the like. The invention may also be practiced in distributed computing environments where tasks are performed by remote processing devices that are linked through a communications network. In a distributed computing environment, program modules may be located in both local and remote memory storage devices.

FIG. 3 is a block diagram representing a general purpose computer system in which aspects of the present invention and/or portions thereof may be incorporated. As shown, the exemplary general purpose computing system includes a computer 320 or the like, including a processing unit 321, a system memory 322, and a system bus 323 that couples various system components including the system memory to the processing unit 321. The system bus 323 may be any of several types of bus structures including a memory bus or memory controller, a peripheral bus, and a local bus using any of a variety of bus architectures. The system memory includes read-only memory (ROM) 324 and random access memory (RAM) 325. A basic input/output system 326 (BIOS), containing the basic routines that help to transfer information between elements within the computer 320, such as during start-up, is stored in ROM 324.

The computer 320 may further include a hard disk drive 327 for reading from and writing to a hard disk (not shown), a magnetic disk drive 328 for reading from or writing to a removable magnetic disk 329, and an optical disk drive 330 for reading from or writing to a removable optical disk 331 such as a CD-ROM or other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide non-volatile storage of computer readable instructions, data structures, program modules and other data for the computer 320.

Although the exemplary environment described herein employs a hard disk, a removable magnetic disk 329, and a removable optical disk 331, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 329, optical disk 331, ROM 324 or RAM 325, including an operating system 335, one or more application programs 336, other program modules 337 and program data 338. A user may enter commands and information into the computer 320 through input devices such as a keyboard 340 and pointing device 342. Other input devices (not shown) may include a microphone, joystick, game pad, satellite disk, scanner, or the like. These and other input devices are often connected to the processing unit 321 through a serial port interface 346 that is coupled to the system bus, but may be connected by other interfaces, such as a parallel port, game port, or universal serial bus (USB). A monitor 347 or other type of display device is also connected to the system bus 323 via an interface, such as a video adapter 348. In addition to the monitor 347, a computer may include other peripheral output devices (not shown), such as speakers and printers. The exemplary system of FIG. 3 also includes a host adapter 355, a Small Computer System Interface (SCSI) bus 356, and an external storage device 362 connected to the SCSI bus 356.

The computer 320 may operate in a networked environment using logical connections to one or more remote computers, such as a remote computer 349. The remote computer 349 may be a personal computer, a server, a router, a network PC, a peer device or other common network node, and may include many or all of the elements described above relative to the computer 320, although only a memory storage device 350 has been illustrated in FIG. 3. The logical connections depicted in FIG. 3 include a local area network (LAN) 351 and a wide area network (WAN) 352. Such networking environments are commonplace in offices, enterprise-wide computer networks, intranets, and the Internet.

When used in a LAN networking environment, the computer 320 is connected to the LAN 351 through a network interface or adapter 353. When used in a WAN networking environment, the computer 320 may include a modem 354 or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing a communications link between the computers may be used.

Computer 320 may include a variety of computer readable storage media. Computer readable storage media can be any available media that can be accessed by computer 320 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 320. Combinations of any of the above should also be included within the scope of computer readable media that may be used to store source code for implementing the methods and systems described herein. Any combination of the features or elements disclosed herein may be used in one or more embodiments.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method comprising:
   capturing an image;
   extracting data from the image that identifies a machine;
   matching the machine with a configuration for a type of machine;
   retrieving a template of configuration data for configuring a diagnostic device for the machine, the template of configuration data based on the identity of the type of machine; and
   configuring the diagnostic device based on the template of configuration data.

2. The method of claim 1, the image further comprising an image of a nameplate.

3. The method of claim 1, the extracted data from the image further comprising text.

4. The method of claim 3, the extracted data from the image comprises text extracted using optical character recognition.

5. The method of claim 1, further comprising:
   comparing text from the image with a repository of data from multiple machines to determine the identity of the machine.

6. The method of claim 1, further comprising:
   querying distributed servers for configuration data based on the identity of the machine.

7. A system comprising:
   an image capture device that captures an image associated with a machine; and
   a diagnostic device comprising a processor and a memory coupled with the processor, the memory comprising executable instructions that when executed by the processor cause the processor to effectuate operations comprising:
   receiving the image,
   extracting data from the image that identifies the machine,
   matching the machine with a configuration for a type of machine,
   retrieving a template of configuration data for configuring a diagnostic device for the machine, the template of configuration data based on the identity of the type of machine, and
   configuring the diagnostic device based on the template of configuration data.

8. The system of claim 7, the memory further comprising executable instructions that when executed by the processor cause the processor to effectuate operations comprising:
   diagnose the machine based on the retrieved configuration data.

9. The system of claim 7, the memory further comprising executable instructions that when executed by the processor cause the processor to effectuate operations comprising:
   automatically adjust the machine configuration based on the retrieved configuration data.

10. The system of claim 7, the image comprising a nameplate that includes text that describes aspects of the machine.

11. The system of claim 7, the image capture device is at least one of a digital camera, tablet computer, a laptop, or a smart phone.

12. The system of claim 7, the extracted data from the image comprises text extracted using optical character recognition.

13. The system of claim 7, further comprising a server that is configured to compare text from the image with a repository of data from multiple machines to determine the identity of the machine.

14. The system of claim 7, further comprising a server that is configured to compare at least part of the machine from the image with a repository of data associated with multiple machines to determine the identity of the machine.

15. A computer readable storage device comprising computer executable instructions that when executed by a processor cause said processor to:

receive an image;

extract data from the image that identifies a machine;

matching the machine with a configuration for a type of machine, retrieve a template of configuration data for configuring a diagnostic device for the machine, the template of configuration data based on the identity of the type of machine, and configure a diagnostic device based on the template of configuration data.

16. The computer readable storage device of claim 15, the extracted data from the image comprising text extracted using optical character recognition.

17. The computer readable storage device of claim 15, the identity of the machine based on a comparison of the image comprising at least part of the machine with a repository of image data associated with multiple machines.

18. The computer readable storage device of claim 15, further comprising instructions to:

diagnose the machine based on the retrieved configuration data.

* * * * *